Aug. 22, 1933.  H. J. MASTENBROOK  1,923,788
VALVE
Filed May 12, 1930
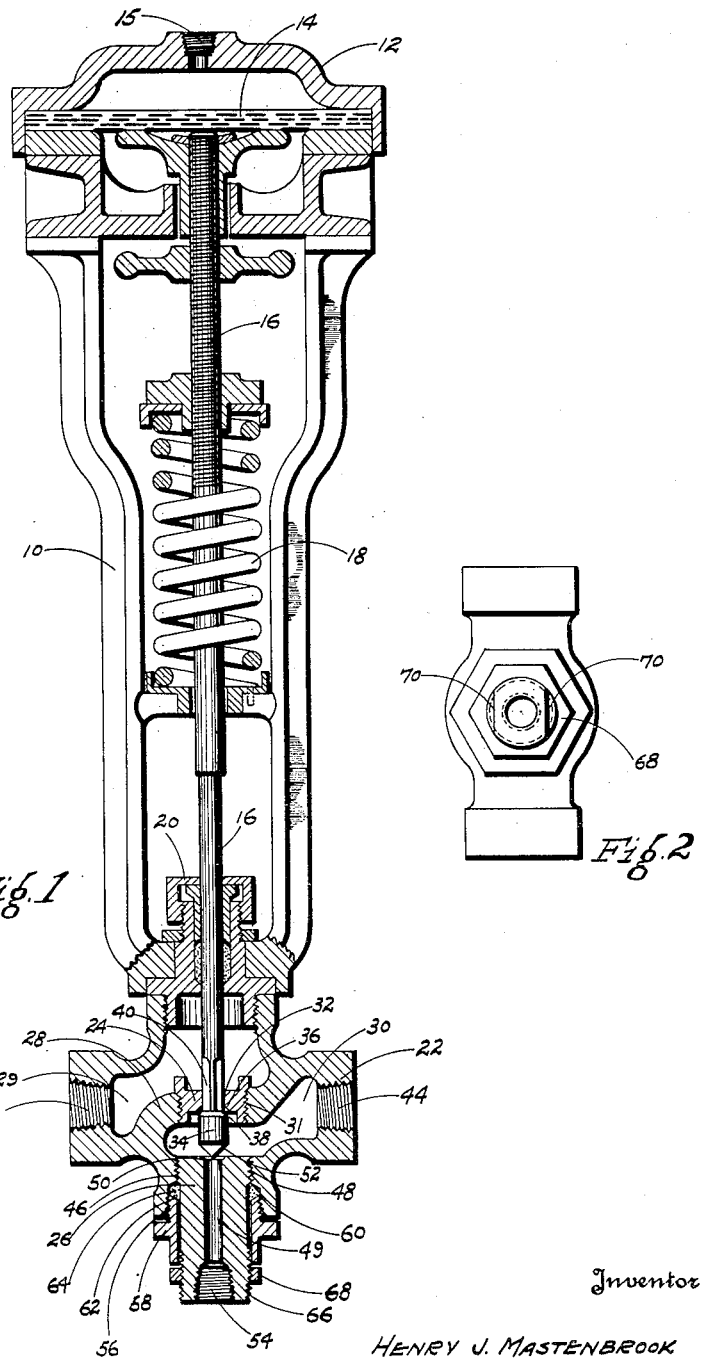
Inventor
HENRY J. MASTENBROOK
By Richey & Watts
Attorney Patented Aug. 22, 1933

1,923,788

UNITED STATES PATENT OFFICE

1,923,788

VALVE

Henry J. Mastenbrook, Cleveland, Ohio, assignor to The Swartwout Company, Cleveland, Ohio, a Corporation of Ohio Application May 12, 1930. Serial No. 451,560

7 Claims. (Cl. 137—153)

This invention relates to valves and especially to three-way pilot valves having a pair of seats and a single closure member for seating on either of said seats.

One of the objects of the present invention is to provide a three-way valve having adjustable seats therein whereby the valve may be adjusted to operate within certain desired limits or may be adjusted to suit different conditions. For example, if the valve is to be used in controlling a shut-off valve where quick action is necessary the seats will be adjusted relatively close to each other, whereas if it is to be used in controlling valves where gradual variation of the valve opening is necessary or desirable the valve seats will be adjusted relatively far apart.

Another object of the invention is to provide a valve of the class described in which the relative position of the seats may be varied while the valve is in its assembled position.

Another object is to provide a valve which can at all times be kept fluid tight irrespective of the adjustment of the relative positions of the seats.

Other objects will appear from the following description of a preferred form of my invention, reference being had to the accompanying drawing. The essential characteristics are summarized in the claims.

In the drawing, Fig. 1 is a side elevation of a control valve, certain parts being shown in section; and Fig. 2 is an end elevation of the lower end thereof.

Referring now more in detail to the drawing, the reference character 10 represents the valve in its entirety. This valve has the usual diaphragm chamber 12 containing the diaphragm 14 against which the upper end of the valve rod 16 is urged by means of the coil spring 18. The lower end of the valve rod extends through the stuffing box 20 into the fitting or valve casing 22 in which are mounted the adjustable valve seats 24 and 26. Leading from the top of the diaphragm chamber is a tapped opening 15 for connecting the chamber to a source of fluid pressure by which it is desired to control the valve openings.

The fitting or casing 22 has a partition 28 therein forming chambers 29 and 30, which partition has a tapped opening 31 therethrough into which is threaded the adjustable valve seat 24. This seat has a port 32 therein through which extends the valve rod 16 the lower end of which is enlarged as at 34 to constitute a closure member for the ports in the valve seats. The port 32 in valve seat 24 is beveled or countersunk as at 36 to form a seat for the beveled shoulder 38 formed between the valve rod and its enlarged head. The valve rod 16 is fluted as at 40 to allow for fluid communication between chambers 29 and 30 when the closure member is unseated from the seat 24. Tapped openings 42 and 44 lead from chambers 29 and 30 respectively in the fitting 22.

A second opening 46 communicates with the chamber 30 and this opening is screw threaded near its inner end as at 48 to accommodate the threaded engagement therewith of the adjustable valve seat 26. The valve seat 26 has a port 49 extending therethrough the upper end of which is beveled or countersunk as at 50 to form a seat for the beveled or tapered end 52 of the closure member 34. The lower end of the port communicates with the tapered opening 54.

Near its outer end the opening 46 is screw threaded on a larger diameter as at 56 and a nut 58 is threaded into such enlarged portion. An inclined shoulder 60 is formed between the threaded portions of different diameters and the inner end of the nut 58 is countersunk as at 62. Between the inclined shoulder 60 and the countersunk end 62 of the nut is disposed a packing gland 64. The outer end of the valve seat 26 is externally screw threaded as at 66 to accommodate the lock nut 68 for holding the valve seat 26 in adjusted position. The outer end of the valve seat 26 has oppositely disposed flattened portions 70 for engagement of a wrench for adjusting the position of the valve seat.

It will thus be seen that by loosening the lock nut 68 and screwing the valve seat 26 in or out the relative position of the valve seats may be changed and that by so changing them the valve may be adjusted to operate within certain limits of the controlling fluid pressure acting on the diaphragm 14.

It will be evident that for a certain setting of the valve seats the valve closure member would be moved from one extreme position to the other extreme by a definite change in the controlling pressure in the diaphragm chamber 12. Now if it be desired to have the valve act within a smaller pressure change it is only necessary to bring the seats closer together by screwing in the seat 26, and this change can be made without dismantling the valve and while the system is in operation. Of course if the port 49 is in fluid communication with a source of pressure, a union would necessarily have to be provided in the line just below the port and this union would have to be loosened sufficiently to allow relative rotational movement of the sections of the line connected together by the union during the adjusting of the valve seat 26. In other instances where the port 49 might be open to the atmosphere no such union would be necessary, unless, of course, a line having bends therein led from the port 49 to the atmosphere. After the seat 26 has been adjusted the nut 58 is tightened to make the joint between the valve seat 26 and the fitting 22 fluid tight and the lock nut is then tightened upon the packing gland 64 to hold the valve seat in adjusted position. Because of this adaptability of valves of the same design and situations of various operating conditions, economies of manufacture are obtained as will be obvious, it being merely necessary to adjust the position of the seats to suit the conditions under which the valve is to operate.

The valve illustrated and described herein constitutes an improvement upon the valve shown and claimed in my copending application Serial No. 324,187, filed December 6th, 1928 in that the construction of the lower adjustable seat in this application is constructed to be readily accessible so that the spacing of the seats may be varied while the valve is in operation.

While the foregoing illustrates and describes a preferred form of my invention, various modifications and improvements may occur to those skilled in the art and I do not care to be limited to the precise form shown herein or in any manner other than by the claims appended hereto.

I claim:

1. In a pressure controlled valve, comprising a casing, a pair of seats in said casing, a closure member adapted to seat on either of said seats, means on one of said seats extending through said casing for varying the distance between said seats, means comprising a stuffing box between said casing and said means, and means for holding said latter seat in adjusted position.

2. In a pressure controlled valve, comprising a casing, a pair of seats in said casing, a closure member adapted to seat on either of said seats, means on one of said seats exterior of said casing for varying the distance between said seats, a stuffing box between said casing and said means, and a lock nut for holding said latter seat in adjusted position.

3. In combination a valve body having an internally threaded aperture, a valve seat threaded into said aperture and having a smooth cylindrical extension lying coaxial thereof and spaced therefrom, and packing means forced between said extensions and the walls of said aperture.

4. In combination a valve body having an internally threaded aperture with threaded parts of different diameter of which the threaded part of lesser diameter lies innermost of said body, a seat in threaded engagement with the innermost threaded part of said aperture and having a part extending coaxial and beyond the larger threaded part of said aperture, and a packing nut in threaded engagement with the larger threaded part of said aperture.

5. In a diaphragm controlled valve, a casing having three outlets, a pair of valve seats separating said outlets from each other, said seats being disposed in substantial alignment, a valve operating between said seats and adapted to selectively seat on either valve seat, a diaphragm for controlling the operation of said valve and means externally of the casing for permitting quick adjustment of the distance between said seats.

6. A pressure controlled valve comprising, in combination, a pair of valve seat members mounted in said casing, each of said members having a valve seat associated therewith, a closure member adapted to seat on either of said seats, means for operating said closure member comprising a diaphragm and a resilient member, means on one of said valve seat members extending exteriorly of said casing and being operable to vary the distance between said valve seats, and a stuffing box between said casing and said means, and a lock nut for holding said latter seat in adjusted position.

7. In combination, a valve casing having a diaphragm chamber, a diaphragm disposed in said chamber, a stem connected to said diaphragm and having a closure member integral therewith, a pair of valve seats, one of said seats having a part projecting beyond said casing, said part having a passage therein opening to atmosphere, said closure member traveling between said valve seats and being adapted to seat on either one, and packing means disposed between said part extending exteriorly of said casing, said part having a smooth exterior surface in the zone encompassed by said packing material.

HENRY J. MASTENBROOK.